US012698455B2

(12) United States Patent
Pechera et al.

(10) Patent No.: US 12,698,455 B2
(45) **Date of Patent: *Aug. 4, 2026**

(54) LAUNDRY DETERGENT COMPOSITION

(71) Applicant: Church & Dwight Co., Inc., Princeton, NJ (US)

(72) Inventors: Leilani D. Pechera, Kendall Park, NJ (US); Archana Gupta, Belle Mead, NJ (US); Steven T. Adamy, Lawrenceville, NJ (US); Vaidehi Shah, Manalapan, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 524 days.

This patent is subject to a terminal disclaimer.

(21) Appl. No.: 17/615,874

(22) PCT Filed: Jun. 2, 2020

(86) PCT No.: PCT/US2020/035665

§ 371 (c)(1),
(2) Date: Dec. 2, 2021

(87) PCT Pub. No.: WO2020/247351

PCT Pub. Date: Dec. 10, 2020

(65) Prior Publication Data

US 2022/0325203 A1 Oct. 13, 2022

Related U.S. Application Data

(60) Provisional application No. 62/856,326, filed on Jun. 3, 2019.

(51) Int. Cl.

| | |
|---|---|
| ***C11D 3/386*** | (2006.01) |
| ***C11D 1/83*** | (2006.01) |
| ***C11D 3/37*** | (2006.01) |
| ***C11D 3/39*** | (2006.01) |
| ***C11D 7/12*** | (2006.01) |
| ***C11D 11/00*** | (2006.01) |

(52) U.S. Cl.
CPC ............ *C11D 3/38618* (2013.01); *C11D 1/83* (2013.01); *C11D 3/3753* (2013.01); *C11D 3/394* (2013.01); *C11D 7/12* (2013.01); *C11D 11/0094* (2013.01)

(58) Field of Classification Search
CPC ..... C11D 3/38618; C11D 1/83; C11D 3/3753; C11D 3/394; C11D 7/12; C11D 11/0094; C11D 1/94; C11D 3/10; C11D 17/043
See application file for complete search history.

(56) References Cited

U.S. PATENT DOCUMENTS

| | | | | |
|---|---|---|---|---|
| 4,973,416 | A | 11/1990 | Kennedy | |
| 5,006,273 | A | 4/1991 | Machin et al. | |
| 5,341,932 | A | 8/1994 | Chen et al. | |
| 6,194,371 | B1 | 2/2001 | Donovan et al. | |
| 6,384,010 | B1 | 5/2002 | Wagers | |
| 6,387,864 | B1 | 5/2002 | Bartelme | |
| 6,521,581 | B1 | 2/2003 | Hsu et al. | |
| 6,730,650 | B1 | 5/2004 | Wood | |
| 6,897,188 | B2 | 5/2005 | Gohl et al. | |
| 6,898,921 | B2 | 5/2005 | Duffield | |
| 7,056,874 | B2 | 6/2006 | Tadrowski et al. | |
| 7,056,876 | B2 | 6/2006 | Shamayeli | |
| 7,094,746 | B2 | 8/2006 | Lentsch et al. | |
| 7,424,891 | B2 | 9/2008 | Gentschev et al. | |
| 7,557,075 | B2 | 7/2009 | Fregonese et al. | |
| 7,709,436 | B2 | 5/2010 | Theiler et al. | |
| 7,915,213 | B2 * | 3/2011 | Adamy | C11D 3/2065 510/501 |
| 8,367,599 | B2 | 2/2013 | Pfeiffer et al. | |
| 9,187,714 | B2 * | 11/2015 | Schmiedel | C11D 1/652 |
| 2005/0119150 | A1 | 6/2005 | Pegelow et al. | |
| 2006/0281658 | A1 | 12/2006 | Kellar et al. | |
| 2013/0065811 | A1 | 3/2013 | Fernandez-Prieto et al. | |
| 2013/0178407 | A1 * | 7/2013 | Fileccia | C11D 17/041 510/109 |
| 2013/0206638 | A1 | 8/2013 | Wong | |
| 2016/0040105 | A1 | 2/2016 | Depoot et al. | |
| 2018/0216033 | A1 | 8/2018 | Camire et al. | |
| 2023/0159867 | A1 * | 5/2023 | Pechera | C11D 3/12 510/296 |

FOREIGN PATENT DOCUMENTS

| | | |
|---|---|---|
| CA | 2377318 C | 10/2009 |
| CA | 2420121 C | 4/2010 |

(Continued)

OTHER PUBLICATIONS

Surfactants: Types and Uses (Oxiteno) Sep. 17, 2019, entire document especially p. 5, Para 4, 13 pages.

*Primary Examiner* — Angela C Brown-Pettigrew
*Assistant Examiner* — Preeti Kumar
(74) *Attorney, Agent, or Firm* — Church & Dwight Co., Inc.

(57) ABSTRACT

An article is provided including an aqueous liquid detergent, and a package for the aqueous liquid detergent which is in direct contact with the aqueous liquid detergent, wherein the package is formed from a water-soluble, film-forming material. The aqueous liquid detergent includes at least about 40% by weight of water based on the total weight of the aqueous liquid detergent, a builder comprising potassium carbonate, wherein the potassium carbonate is present in an amount of at least about 25 weight percent, based on the total weight of the aqueous liquid detergent, a first surfactant, wherein the first surfactant is an anionic surfactant, and a second surfactant, wherein the second surfactant is a nonionic or an amphoteric surfactant. The first surfactant and the second surfactant are present in a combined total amount of about 0.1% to about 25% percent by weight based on the total weight of the aqueous liquid detergent.

14 Claims, No Drawings

(56) References Cited

FOREIGN PATENT DOCUMENTS

| | | | | |
|---|---|---|---|---|
| CA | 2897079 | A1 | 7/2014 | |
| EP | 1520004 | B1 | 12/2006 | |
| EP | 1549732 | B1 | 3/2007 | |
| EP | 1786893 | B2 | 11/2016 | |
| EP | 2757143 | B1 | 12/2017 | |
| EP | 2346976 | B1 | 2/2019 | |
| WO | WO-0036079 | A1 * | 6/2000 | ......... C11D 17/0026 |
| WO | WO2016/060378 | A1 | 4/2016 | |

* cited by examiner

LAUNDRY DETERGENT COMPOSITION

CROSS-REFERENCE TO RELATED APPLICATIONS

The present application is a U.S. National Stage of International Patent Application PCT/US2020/035665, filed Jun. 2, 2020, and claims priority to U.S. Provisional Patent Application No. 62/856,326, filed Jun. 3, 2019. The disclosures of each of the applications noted above are incorporated herein by reference in their entirety.

FIELD OF THE INVENTION

The present invention relates to compositions for use in laundry machines, and more particularly to an aqueous liquid detergent composition.

BACKGROUND

This invention relates to high water content liquid laundry detergents in unit dosage form in a package comprising a water-soluble, film-forming material.

The use of water-soluble film packages to deliver unit dosage amounts of laundry products is well known. Granular detergents and granular bleaches have been sold in this form in the United States for many years. A compact granular detergent composition in a water-soluble film pouch has been described in Japanese Patent Application No. 61-151032, filed Jun. 27, 1986, which is incorporated herein by reference. A paste detergent composition packaged in a water-soluble film is disclosed in Japanese Patent Application No. 61-151029, also filed Jun. 27, 1986. Further disclosures relating to detergent compositions which are either pastes, gels, slurries, or mulls packaged in water-soluble films can be found in U.S. Pat. No. 8,669,220 to Huber et al.; U.S. Pat. App. Pub. Nos. 2002/0033004 to Edwards et al., 2007/0157572 to Oehms et al., and 2012/0097193 to Rossetto et al.; Canadian Patent No. 1,112,534 issued Nov. 17, 1981; and European Patent Application Nos. 158464 published Oct. 16, 1985 and 234867, published Sep. 2, 1987; each of which is incorporated herein by reference. A liquid laundry detergent containing detergents in a water/propylene glycol solution is disclosed in U.S. Pat. No. 4,973,416, which is herein incorporated by reference. See, also, U.S. Pat. No. 7,915,213 to Adamy et al. and U.S. Pat. App. Pub. No. 2006/0281658 to Kellar et al., which disclose high builder compositions in pods and are both herein incorporated by reference.

It is generally believed that high water content liquid laundry detergents are incompatible with water-soluble films because of their water content. Thus, the attendant advantages of high water content liquid laundry detergents over other forms of laundry detergents such as granules, pastes, gels, and mulls have not been readily available in water-soluble unit dosage form. The advantages of liquid laundry detergents over granules, pastes, gels, and mulls include their aesthetic appearance and the faster delivery and dispersibility of the detergent ingredients to the laundry wash liquor, especially in a cool or cold water washing process.

The use of a water-soluble alkaline carbonate builder in the detergent composition can help prevent the aqueous detergent composition from dissolving the water-soluble package material. Laundry detergent compositions comprising a water-soluble alkaline carbonate are well-known in the art. For example, it is conventional to use such a carbonate as a builder in detergent compositions which supplement and enhance the cleaning effect of an active surfactant present in the composition. Such builders improve the cleaning power of the detergent composition, for instance, by the sequestration or precipitation of hardness causing metal ions such as calcium, peptization of soil agglomerates, reduction of the critical micelle concentration, and neutralization of acid soil, as well as by enhancing various properties of the active detergent, such as its stabilization of solid soil suspensions, solubilization of water-insoluble materials, emulsification of soil particles, and foaming and sudsing characteristics. Other mechanisms by which builders improve the cleaning power of detergent compositions are less well understood. Builders are important not only for their effect in improving the cleaning ability of active surfactants in detergent compositions, but also because they allow for a reduction in the amount of the surfactant used in the composition, the surfactant being generally much more costly than the builder.

Sodium carbonate ($Na_2CO_3$) and/or potassium carbonate ($K_2CO_3$) are the most common carbonates included in laundry detergents to impart increased alkalinity to wash loads, thereby improving detergency against many types of soils. In particular, soils having acidic components e.g. sebum and other fatty acid soils, respond especially well to increased alkalinity.

While laundry detergents containing a relatively large amount of carbonate builder are generally quite satisfactory in their cleaning ability, the use of such carbonate builders often results in the problem of calcium carbonate precipitation, which may give rise to fabric encrustation due to the deposition of the calcium carbonate on the fiber surfaces of fabrics which in turn causes fabric to have a stiff hand and gives colored fabrics a faded appearance. Thus, any change in available carbonate built laundry detergent compositions which reduces their tendency to cause fabric encrustation is highly desirable.

In many applications, it is desirable to include $Na_2CO_3$ and $K_2CO_3$ in detergent formulations at levels greater than 20%. This is readily achieved in the case of a powdered detergent. However, incorporating such large amounts into an aqueous liquid is much more difficult. In liquid laundry detergent compositions, the incorporation of a large amount of detergent builder poses a significant formulation challenge since the presence of a major quantity of detergent builder inevitably causes the detergent composition to phase separate. Liquid detergent formulations that contain a detergent builder ingredient require careful control of the surfactant to builder ratio so as to prevent salting-out of the surfactant phase. Liquid laundry detergent compositions are also susceptible to instability under extended freeze/thaw and high/low temperature conditions.

Additionally, sodium carbonate forms an extensive array of low water soluble hydrates at low temperatures and high, i.e., >15 wt. % levels of the sodium carbonate builder. For example, a system with 20% carbonate builder will form a decahydrate phase below 23° C. At 30% sodium carbonate, the decahydrate will form below 31° C. Therefore, even at room temperature, systems containing greater than 20% carbonate builder are inherently unstable and readily form decahydrate phases. Once the decahydrate forms, redissolution can take an inordinate amount of time.

Accordingly, there is still a desire and a need to provide a stable liquid laundry detergent that is still suitable for use in forming dose packs or pods with a water-soluble, film-forming material, which is in direct contact with the liquid laundry detergent.

SUMMARY OF THE INVENTION

In one aspect of the present invention, an aqueous liquid detergent is provided. The aqueous detergent compositions described herein demonstrate a unique combination of high water content (e.g., 50-65%), high builder/salt level (e.g., 25-35% potassium carbonate), high-electrolyte-tolerant surfactants (e.g., 1-15%), and optionally, high-pH-stable enzymes (stable at pH 12-13). The formulations described herein are capable of forming a homogeneous clear or opaque formulation that does not dissolve the water-soluble poly (vinyl alcohol) film encapsulating the formulation.

An aqueous liquid detergent is provided herein, the detergent comprising at least about 40% by weight of water based on the total weight of the aqueous liquid detergent, a builder comprising potassium carbonate, wherein the potassium carbonate is present in an amount of at least about 25 weight percent, based on the total weight of the aqueous liquid detergent, and a first surfactant and a second surfactant. The first surfactant can be an anionic surfactant and the second surfactant can be a nonionic or an amphoteric surfactant. The first surfactant and the second surfactant can be present in a combined total amount of about 0.1% to about 25% percent by weight based on the total weight of the aqueous liquid detergent. In some embodiments, the aqueous liquid detergent can further include a third surfactant, wherein the third surfactant is a nonionic or an amphoteric surfactant. In certain embodiments, the aqueous liquid detergent can further comprise at least one enzyme which is stable at an alkaline pH. For example, the at least one enzyme can include a protease enzyme.

In some embodiments, the second surfactant is a nonionic surfactant, and the second nonionic surfactant and the first anionic surfactant are present in a weight ratio of about 4:1 of nonionic surfactant to anionic surfactant, on a percent actives basis. In various embodiments, the second surfactant is an amphoteric surfactant, and the first anionic surfactant and the second amphoteric surfactant are present in a weight ratio of at least about 4:1 of anionic surfactant to amphoteric surfactant, on a percent actives basis.

In various embodiments of the aqueous liquid detergent compositions described herein, water is present in an amount of about 30 to about 70 weight percent, or about 40 to about 65 weight percent, or about 50 to about 65 weight percent, based on the total weight of the aqueous liquid detergent. In some embodiments, the aqueous liquid detergent composition further comprises at least one enzyme stabilizer. For example, the at least one enzyme stabilizer can be glycerin. In certain embodiments, the aqueous liquid detergent is substantially free of any thickening agents.

An article is also provided herein, the article comprising an aqueous liquid detergent composition as described herein, and a package for the aqueous liquid detergent which is in direct contact with the aqueous liquid detergent, wherein the package is formed from a water-soluble, film-forming material. In some embodiments, the water-soluble film-forming material is polyvinyl alcohol.

Other aspects and advantages of the present invention will become apparent from the following.

DETAILED DESCRIPTION OF THE INVENTION

The present disclosure now will be described more fully hereinafter with reference to the accompanying drawings. The disclosure may be embodied in many different forms and should not be construed as limited to the embodiments set forth herein; rather, these embodiments are provided so that this disclosure will satisfy applicable legal requirements. Like numbers refer to like elements throughout. As used in this specification and the claims, the singular forms "a," "an," and "the" include plural references unless the context clearly dictates otherwise.

In one aspect of the present invention, an article is provided, the article for use in the laundry process comprising an aqueous liquid detergent and a package for the aqueous liquid detergent. More particularly, the article is an aqueous, organic solvent free, liquid laundry detergent contained in a package, preferably a pouch or packet, containing a unit dose of the liquid laundry detergent, the package comprising a water soluble film-forming material that dissolves when placed in the laundry wash water so as to release the liquid laundry detergent. As used herein, terms such as "package", "pod", "pouch", and the like can be used interchangeably to describe the water-soluble film forming the article enclosing liquid laundry detergents described herein. According to the invention, the water-soluble film-forming material is in substantially direct contact with the liquid laundry detergent, with the film-forming material maintaining its structural integrity prior to external contact with an aqueous medium, such as a laundry wash liquor. The liquid detergent is capable of remaining homogeneous over a relatively wide temperature range, such as might be encountered in storage, and the pouch is capable of dissolution in water even after extended storage.

The water-soluble package of this invention can preferably be made from polyvinyl alcohol, but can also be cast from other water-soluble materials such as polyethylene oxide, methyl cellulose and mixtures thereof. Suitable water-soluble films are well known in the art and are commercially available from numerous sources.

The liquid laundry detergent package itself can be of any configuration, but conveniently may have a rectangular or square shape when viewed normally to the plane of its two longest dimensions. A rectangular or square packet is more easily manufactured and sealed than other configurations when using conventional packaging equipment.

The liquid laundry detergent for use in this invention is formulated in a manner which makes it compatible with the water-soluble film for purposes of packing, shipping, storage, and use. Without being limited by theory, compatibility of the liquid laundry detergent with the water-soluble film can be achieved by the use of at least one appropriate surfactant at a specific weight percentage in the liquid laundry detergent composition. The liquid laundry detergent is a concentrated, heavy-duty liquid detergent which can contain at least about 25 weight percent, at least about 30 weight percent, at least about 40 weight percent, at least about 50 weight percent, or at least about 60 weight percent of water, based on the weight of the overall detergent composition. In some embodiments, water can be present in an amount of about 25 weight percent to about 75 weight percent, about 45 weight percent to about 70 weight percent, about 40 weight percent to about 65 weight percent, or about 50 weight percent to about 65 weight percent, based on the total weight of the detergent composition.

As described herein, embodiments of the invention relate to an aqueous liquid detergent, which can be encapsulated in a water-soluble package. In particular, various embodiments of the present invention relate to an aqueous liquid detergent comprising a water-soluble alkaline carbonate builder, at least one nonionic or amphoteric surfactant, and at least one anionic surfactant. The formulations are essentially homogenous (show substantially no phase separation) for an extended time period and temperature range. In certain embodiments, the detergent can be clear. In some embodiments, the detergents provided herein are not clear transparent liquids, but are rather turbid and similar in form to pastes or gels. Without being limited by theory, it is noted that varying the level of certain surfactant(s) (e.g., Steol®, an anionic surfactant) can affect the solubility of the carbonate builder in the detergent composition and thereby affect whether the detergent composition is clear or opaque. Similarly, certain enzymes can also affect whether the detergent composition is clear or opaque. While homogeneity of the formulations provides a desirable product appearance, phase separation can also be a product performance issue, since both phases in a phase-separated system may not disperse and dissolve rapidly during the wash cycle, although the formulation may have dispersed and dissolved rapidly before phase separation occurred.

The water-soluble alkaline carbonate builder in the detergent composition can comprise, for example, an alkali metal carbonate, bicarbonate, or sesquicarbonate (preferably sodium or potassium carbonate, bicarbonate, or sesquicarbonate), or mixtures thereof. In certain embodiments, the builder comprises potassium carbonate. The presence of the builder in the formulation renders the aqueous liquid detergent non-solubilizing relative to the water-soluble pouch (made from, for example, polyvinyl alcohol and/or polyvinyl acetate). As such, the presence of the builder results in compatibility between the pouch and the formulation by preventing the aqueous detergent from dissolving the water-soluble package the aqueous detergent is stored within. The builder (e.g., potassium carbonate) also allows for the detergent composition to comprise a higher water content than the water content of many conventional detergent packages. The high water content of the formulations of the present invention, in addition to allowing rapid dispersion and dissolution in the wash cycle, can result in a significant cost reduction, thereby making a pouch-type detergent available to the consumer at a significantly lower price.

The aqueous liquid detergents of the present invention can comprise a builder in an amount of about 15% to about 50% by weight, about 20% to about 40% by weight, or about 25% to about 35% by weight, based on the total weight of the aqueous liquid detergent. In certain embodiments, the detergent composition can comprise a builder in an amount of at least about 15% by weight, at least about 25% by weight, or at least about 30% by weight, based on the total weight of the aqueous liquid detergent.

The presence of the builder in the detergent composition can render the composition susceptible to phase changes and separations before the composition reaches its final homogeneous form. However, the surfactants selected in embodiments of the compositions described herein (e.g., alkylpolyglucosides) are highly salt-tolerant or electrolyte-tolerant, and as such, the compositions described herein did not exhibit phase separation when the builder (e.g., potassium carbonate) was added.

Some embodiments of the aqueous liquid detergent compositions described herein can comprise at least one surfactant. For example, the detergent compositions can comprise a nonionic surfactant, an anionic surfactant, an amphoteric surfactant, or combinations thereof. In some embodiments, it can be advantageous for a nonionic surfactant to be present in an amount of at least 50% by weight based on the total weight of surfactant employed. It is noted that the weight percentage of each surfactant in the detergent composition may differ from the percentage of active surfactant. In certain embodiments, the composition can comprise at least one surfactant selected from the group consisting of alkylpolyglucosides, alkyl ether sulfates, alkoxylated carboxylates, alkyldiphenyloxide disulfonates, and amphoterics (e.g. disodium cocoamphodipropionates, sodium alkyliminodipropionates, and disodium cocoamphodiacetates). An example of a disodium cocoamphodiacetate is Miranol C2M CONC NP (38.5% actives). In certain embodiments, the aqueous liquid detergent composition can comprise Steol® (an alkyl ether sulfate, an anionic surfactant) and Glucopon (an alkylpolyglucoside, a nonionic surfactant).

In various embodiments, the detergent compositions described herein comprise at least one anionic surfactant and at least one nonionic surfactant. The weight ratio of the nonionic surfactant to the anionic surfactant can be about 99:1 to about 70:30, or about 90:10 to about 75:25. In certain embodiments, the weight ratio of the nonionic surfactant to the anionic surfactant can be about 80:20, based on the percentage of each surfactant that is active. It is noted that commercially available surfactants may be diluted or mixed with additional ingredients beyond the surfactant actives (e.g., water). For consistency, the weight ratio of the surfactants is referring to the weight ratio of the surfactant actives. In some embodiments, the detergent compositions described herein comprise at least one anionic surfactant and at least one amphoteric surfactant. The weight ratio of the anionic surfactant to the amphoteric surfactant can be about 99:1 to about 70:30, or about 90:10 to about 75:25 (based on the percentage of surfactant actives). In certain embodiments, weight ratio of the anionic surfactant to the amphoteric surfactant can be at least about 80:20, based on the percentage of each surfactant that is active. If an amphoteric surfactant is used, the weight ratio of the anionic surfactant to the amphoteric surfactant is preferably greater than 80:20 (based on the percentage of surfactant actives).

In various embodiments, the total amount of active surfactants in the detergent composition (i.e., anionic surfactant and nonionic and/or amphoteric surfactant) can be about 1-25 weight percent, about 1-15 weight percent, about 1-10 weight percent, about 1-5 weight percent, about 5-15 weight percent, or about 10-15 weight percent, based on the total weight of the aqueous liquid detergent. In certain embodiments, the total amount of active surfactants in the detergent composition can be at least about 1% by weight, at least about 5% by weight, at least about 10% by weight, or at least about 15% by weight based on the total weight of the aqueous liquid detergent.

Various embodiments of the detergent compositions described herein can include additional ingredients conventionally found in detergent compositions. For example, the detergent compositions can include enzyme(s), dye(s), chelating agent(s), antiredeposition polymer(s), fluorescent whitening agent(s), fragrance(s), bittering agent(s), etc. For example, it was surprisingly discovered that high-pH-stable enzymes (e.g., stable at a pH of 12-13) can be useful in detergent compositions described herein. In general, additional ingredients in the liquid detergent compositions can be present in an amount of about 0.1 to about 10 weight percent, or about 1 to about 8 weight percent. In some embodiments, additional ingredients can be present in an amount of less than about 10 weight percent, less than about 8 weight percent, less than about 5 weight percent, less than about 3 weight percent, or less than about 1 weight percent, based on the total weight of the aqueous detergent composition.

A method of preparing an aqueous liquid detergent is also provided herein. In various embodiments, the method of preparing the detergent composition can comprise mixing the two or more surfactants in an aqueous liquid medium to form a first mixture and adding a builder comprising potassium carbonate to the first mixture to form the aqueous liquid detergent as a substantially homogeneous solution. It was surprisingly discovered that the order of addition of the components of the detergent composition can contribute to an increase in the ease of mixing and a decrease in undesirable phase changes and separations. Adding the surfactants early in the mixing process can be desirable.

In some embodiments, a method of preparing an aqueous liquid detergent comprises first pre-mixing a surfactant such as Steol® with water and then adding another surfactant. Next, additional ingredients such as a chelating agent (e.g., EDTA), an antiredeposition polymer (e.g., Acusol), a bittering agent (e.g., Bitrex), and/or an enzyme. Next, a builder (e.g., potassium carbonate) in solid form can be added to the mixture. Finally, glycerin can be added to the mixture. The mixture can then be mixed at a high speed of mixing to create a homogeneous solution.

In some embodiments, the method of preparing an aqueous liquid detergent can further include preparing a detergent article by placing a measured amount of the aqueous liquid detergent into a package for the aqueous liquid detergent. As discussed in more detail above, the package can be in direct contact with the aqueous liquid detergent. Furthermore, the package can be formed from a water-soluble, film-forming material, however, the film-forming material is insoluble with respect to the aqueous liquid detergent contained within the package. After placing a measured amount of the aqueous liquid detergent into the package, the water-soluble, film forming material of the package can be heat sealed in order to close the detergent within the package.

EXPERIMENTAL

Example 1

Surfactants were first screened for compatibility with high levels of potassium carbonate. If the surfactants did not show phase separation with 30% potassium carbonate and 5% glycerin, then phase composition studies were performed. Extensive ternary phase composition studies were conducted to screen numerous surfactant combinations, evaluating simple surfactant systems or full formulations that included detergent minors.

Stock solutions (150-g each, labeled A-C, each letter corresponding to a test surfactant) were separately prepared in beakers. Using transfer pipettes, aliquots of A, B & C were added into test tubes corresponding to varying surfactant combinations. The test tubes were vortexed to mix. Potassium carbonate (3 g) was added to each test tube, vortexed to mix, and cooled to room temperature. Glycerin (0.5 g) and protease (0.175 g) were then added sequentially to each test tube. After mixing by vortex, the test tubes were evaluated.

Many surfactants and surfactant combinations showed phase separation/instability in the presence of high levels (e.g. 30%) of potassium carbonate. Among the surfactants tested, alkylpolyglucosides, alkyl ether sulfates, alkoxylated carboxylates, alkyldiphenyloxide disulfonates, and amphoterics (e.g., disodium cocoamphodipropionates, sodium alkyliminodipropionates, and disodium cocoamphodiacetates) showed stability with high levels of potassium carbonate (e.g. 30% $K_2CO_3$) in water.

The clarity and opacity of the formulation was found to be significantly affected by the concentration of alkyl ether sulfate (AES), in combination with certain surfactants. For example, if the concentration of AES was 10-40%, clear formulations were observed. If the concentration of AES was 70%, opaque formulations were seen. The presence of enzymes was also observed to contribute to haziness of the formulation.

Example 2

A sample detergent composition was formed according to the method described in Example 1 above. The detergent formulation was clear and had 1 weight percent of total surfactants. The detergent composition, which was determined to be stable, is provided in Table 1 below.

TABLE 1

An example of a simple clear liquid detergent composition with about 1 wt. % surfactants

| Ingredient | Weight % |
|---|---|
| Water | 60-70 wt. % |
| Glycerin | 4-6 wt. % |
| Alkyl ether sulfate | 0.1-0.3 wt. % |
| Alkylpolyglucoside | 0.5-1.5% |
| Potassium Carbonate | 25-35 wt. % |
| Dye or Colorant | 0.001-0.01 wt. % |
| Total | 100 |

Phase-stable liquid laundry detergent formulations were enclosed in poly (vinyl alcohol) film using a simple Uline heat sealer, thereby forming unit dose pods. These pods were tested for stability at room temperature (RT) and after 50° C.-RT (or 60° C.-RT) cycling. For each cycle, the pod was left at the cycled temperature for approximately 12-24 hours, and then allowed to cool to room temperature before being heated to the cycle temperature again.

The clear liquid formulation described in Table 1 above was observed to remain homogeneous and the pods were observed to be intact after a) 6 weeks at room temperature, and b) after 7 cycles of 50° C.-RT.

Example 3

A sample detergent composition was formed according to the method described in Example 1 above. The detergent formulation was clear and had about 12 weight percent of total surfactants. The detergent composition, which was determined to be stable, is provided in Table 2 below.

TABLE 2

An example of a simple clear liquid detergent composition with about 12 wt. % surfactants

| Ingredient | Weight % |
|---|---|
| Water | 45-60 wt. % |
| Clelating Agent | 0.05-0.2 wt. % |
| Glycerin | 4-6 wt. % |
| Alkyl ether sulfate | 1.0-2.0 wt. % |
| Antiredeposition polymer | 0.5-2.0 wt. % |
| Alkylpolyglucoside | 8-12 wt. % |
| Potassium Carbonate | 25-35 wt. % |
| Bittering Agent | 0.01-0.1 wt. % |
| Dye | 0.001-0.01 wt. % |
| Total | 100 |

Phase-stable liquid laundry detergent formulations were enclosed in poly (vinyl alcohol) film using a simple Uline heat sealer, thereby forming unit dose pods. These pods were tested for stability at 40° C. The clear liquid formulation described in Table 2 above was observed to remain homogeneous and the pods were observed to be intact after 3 months at 40° C.

Example 4

A sample detergent composition was formed according to the method described in Example 1 above. The detergent composition, which was determined to be stable, is provided in Table 3 below.

TABLE 3

An example of a simple clear liquid detergent composition with about 5 wt. % surfactants

| Ingredient | Weight % |
|---|---|
| Water | 50-65 wt. % |
| Glycerin | 4-6 wt. % |
| Anionic Surfactant (alkyl ether sulfate) | 0.5-2 wt. % |
| Nonionic Surfactant (alkylpolyglucoside) | 2-6 wt. % |
| Amphoteric surfactant | 0.01-2 wt. % |
| Potassium Carbonate | 25-35 wt. % |
| Minors* | 0.01-2 wt. % |
| Total | 100 |

*Minors may include dye, bitrex, fragrance, chelating agent, enzymes, and antiredeposition polymer The values of surfactants provided in Table 3 above are weight percentages of active surfactants added to the formulation.

Phase-stable liquid laundry detergent formulations were enclosed in poly (vinyl alcohol) film using a simple Uline heat sealer, thereby forming unit dose pods. These pods were tested for stability at 40° C. The clear liquid formulation described in Table 3 above was observed to remain homogeneous and the pods were observed to be intact after 3 months at 40° C.

Example 5

The stability of the protease enzyme in a formulation containing a high level of potassium carbonate was tested and found to be surprising, as the high ionic strength of the detergent formulation was expected to be incompatible with the enzyme. The pH of the liquid detergent formulation (pH 12-13) was also much higher than the recommended pH 10.6, and there were no enzyme stabilizers added in the detergent formulation other than glycerin (4-6 wt. %).

The qualitative protease assay utilized the enzymatic action on a non-colored AAPF substrate (N-succinyl-ala-ala-pro-phe-p-nitroanilide) forming a yellow colored product p-nitroaniline. The yellow color indicated that the protease enzyme remained active in the formulation.

Tris Buffer solution was prepared, containing 0.1M Tris (hydroxymethyl) aminomethane, 0.01M calcium chloride, and 0.005% Triton X-I00. Hydrochloric acid was used to adjust the pH to 8.6. The resulting solution was filtered through 0.45μ filter membrane. A Stock Substrate solution (20 mg/mL) was prepared in a scintillation vial by dissolving 200 mg of the AAPF substrate in 10 mL dimethylsulfoxide (DMSO). A Working Substrate solution (1 mg/mL) was prepared by mixing 4.75 mL Tris Buffer with 2504 of the Stock Substrate solution.

Using a transfer pipet, test sample detergent (six drops) was mixed with 20-mL deionized water in a scintillation vial. An aliquot (100 μL) of the resulting test sample solution was then transferred to a test tube and mixed with two mL of Tris Buffer Solution and one mL of Working Substrate Solution. The test tubes were viewed after 10 minutes for yellow color formation. Controls included the alkaline-stable protease enzyme (positive control), and the laundry detergent formulation excluding the enzyme (negative control).

Qualitative Protease Assay results have shown that the protease enzyme remained surprisingly active in the high water unit dose liquid laundry detergent pod formulations, even after 12 weeks at room temperature and 5 weeks at 40° C.

Many modifications and other embodiments of the disclosure will come to mind to one skilled in the art to which this disclosure pertains having the benefit of the teachings presented in the foregoing description; and it will be apparent to those skilled in the art that variations and modifications of the present disclosure can be made without departing from the scope or spirit of the disclosure. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An article comprising:

an aqueous liquid detergent; and a package for the aqueous liquid detergent which is in direct contact with the aqueous liquid detergent, wherein the package is formed from a water-soluble, film-forming material;

wherein the aqueous liquid detergent is homogenous and comprises:

at least about 40% by weight of water based on the total weight of the aqueous liquid detergent;

potassium carbonate in an amount of at least 30 weight percent, based on the total weight of the aqueous liquid detergent;

at least one enzyme stable at an alkaline pH;

an anionic surfactant; and a nonionic surfactant;

wherein a total amount of surfactant in the aqueous liquid detergent is about 0.1% to about 25% percent by weight based on the total weight of the aqueous liquid detergent, and wherein a weight ratio of the nonionic surfactant to the anionic surfactant on a percent actives basis is about 90:10 to about 75:25.

2. The article of claim 1, wherein the water is present in an amount of about 50 to about 65 weight percent, based on the total weight of the aqueous liquid detergent.

3. The article of claim 1, wherein the aqueous liquid detergent further comprises at least one enzyme stabilizer.

4. The article of claim 3, wherein the at least one enzyme stabilizer is glycerin.

5. The article of claim 1, wherein the aqueous liquid detergent is free of any thickening agents.

6. The article of claim 1, wherein the aqueous liquid detergent further comprises a third surfactant, wherein the third surfactant is a nonionic or an amphoteric surfactant.

7. The article of claim 1, wherein the water-soluble film-forming material is polyvinyl alcohol.

8. The article of claim 1, wherein the anionic surfactant is an alkyl ether sulfate.

9. The article of claim 1, wherein the nonionic surfactant is an alkylpolyglucoside.

10. The article of claim 1, wherein the aqueous liquid detergent remains homogenous and the package remains intact following at least 7 cycles of 50° C.-RT, wherein each cycle of the at least 7 cycles of 50° C.-RT comprises holding the article at a temperature of about 50° C. for about 12-24 hours and cooling the article to room temperature before starting another cycle.

11. The article of claim 1, wherein the aqueous liquid detergent has a pH of greater than 10.6.

12. The article of claim 1, wherein the at least one enzyme comprises a protease enzyme.

13. The article of claim 1, wherein the aqueous liquid detergent excludes sodium carbonate.

14. The article of claim 1, wherein the aqueous liquid detergent remains homogenous and the package remains intact for a time period of at least 3 months at a temperature of about 40° C.

* * * * *